United States Patent
Hou et al.

(10) Patent No.: US 9,676,303 B2
(45) Date of Patent: Jun. 13, 2017

(54) CAR SEAT AND BASE WITH A LOCKING MECHANISM

(71) Applicant: LERADO (ZHONG SHAN) INDUSTRIAL CO., LTD., Zhong Shan, Guang Dong Province (CN)

(72) Inventors: Hung-Chung Hou, Tai-Bau (TW); Chin-Hui Wang, Chiayi (TW)

(73) Assignee: Dorel Juvenile (Zhongshan) Product Co., Ltd., Zhong Shan, Guang Dong Province (CN)

( * ) Notice: Subject to any disclaimer, the term of this patent is extended or adjusted under 35 U.S.C. 154(b) by 167 days.

(21) Appl. No.: 14/520,167

(22) Filed: Oct. 21, 2014

(65) Prior Publication Data
US 2015/0108801 A1    Apr. 23, 2015

(30) Foreign Application Priority Data

Oct. 21, 2013  (CN) ..................... 2013 2 0648399 U

(51) Int. Cl.
*B60N 2/28*    (2006.01)
(52) U.S. Cl.
CPC ......... *B60N 2/2821* (2013.01); *B60N 2/2845* (2013.01)
(58) Field of Classification Search
None
See application file for complete search history.

(56) References Cited

U.S. PATENT DOCUMENTS

| 5,857,832 | A * | 1/1999 | Al-Temen | B60N 2/245 |
| | | | | 280/727 |
| 6,070,890 | A * | 6/2000 | Haut | B60N 2/2821 |
| | | | | 280/30 |
| 6,199,949 | B1 * | 3/2001 | DaSilva | B60N 2/2806 |
| | | | | 297/256.12 |
| 6,318,807 | B1 * | 11/2001 | Perego | B62B 7/142 |
| | | | | 297/130 |
| 6,367,875 | B1 * | 4/2002 | Bapst | A47D 13/02 |
| | | | | 297/130 |
| 6,428,100 | B1 * | 8/2002 | Kain | B60N 2/2806 |
| | | | | 297/130 |
| 7,798,571 | B2 * | 9/2010 | Billman | B60N 2/28 |
| | | | | 297/188.01 |
| 2005/0264062 | A1 * | 12/2005 | Longenecker | B60N 2/2806 |
| | | | | 297/250.1 |
| 2007/0046087 | A1 * | 3/2007 | Nakagawa | B60N 2/2821 |
| | | | | 297/256.13 |

(Continued)

*Primary Examiner* — David E Allred
(74) *Attorney, Agent, or Firm* — Muncy, Geissler, Olds & Lowe, P.C.

(57) ABSTRACT

A car seat and base with a locking mechanism are disclosed, in which the locking mechanism is mounted on the base, and a release mechanism is mounted on the car seat. The locking mechanism comprises a hooking element can be rotated to a locked position for retaining the car seat to the base, and to a release position to release the car seat from the base. The release mechanism comprises a release actuator and a plectrum follower. The release actuator is operatively mounted on the car seat, and the plectrum follower is associated with the release actuator for rotating the hooking element from the locked position to the release position, so as to permitting a user to release the car seat from the base by operating of the release actuator.

6 Claims, 5 Drawing Sheets

(56) References Cited

U.S. PATENT DOCUMENTS

| | | | |
|---|---|---|---|
| 2010/0225150 A1* | 9/2010 | Duncan | B60N 2/2806 297/256.12 |
| 2011/0109137 A1* | 5/2011 | Tamanouchi | B60N 2/2806 297/250.1 |
| 2011/0233903 A1* | 9/2011 | Williams | B60N 2/2821 280/648 |
| 2011/0298259 A1* | 12/2011 | Heisey | B60N 2/2821 297/256.16 |
| 2012/0013159 A1* | 1/2012 | Williams | B60N 2/2821 297/256.16 |
| 2012/0326474 A1* | 12/2012 | Williams | B60N 2/2821 297/183.1 |
| 2013/0140864 A1* | 6/2013 | Fang | B60N 2/2821 297/256.16 |
| 2014/0001804 A1* | 1/2014 | Chen | B60N 2/2821 297/256.16 |
| 2014/0252829 A1* | 9/2014 | Williams | B60N 2/2842 297/256.16 |
| 2014/0361589 A1* | 12/2014 | Hou | B60N 2/2824 297/256.16 |
| 2016/0046213 A1* | 2/2016 | Kirstein | B60N 2/2875 297/256.13 |

* cited by examiner

CAR SEAT AND BASE WITH A LOCKING MECHANISM

BACKGROUND OF THE INVENTION

Field of the Invention

The present invention relatives to a car seat and base with a locking mechanism; especially to a locking mechanism including a hooking element which can be rotated to a release position by a plectrum follower directly for releasing the car seat from the base.

Description of the Related Art

Locking mechanism adopted in a traditional car seat and base may always be composed of a lot of tiny parts. In case the parts are too tiny and weak, the structure shall be weak also, and the products with such a weak structure shall take more time-cost in manufacturing and assembly process. Further, as if the locking mechanism is complex and weak, may cause some malfunction in use, and sometime the lock and unlock of the car seat may anxiously failed.

SUMMARY OF THE INVENTION

To solve the aforementioned problem of weak and complex structure of the locking mechanism adopted in the car seat and base, the present invention provides a car seat and base with a simplified locking mechanism, wherein the locking mechanism is mounted on the base, and a release mechanism is mounted on the car seat.

The locking mechanism comprises a hooking element can be rotated to a locked position for retaining the car seat to the base, and to a release position to release the car seat from the base.

The release mechanism comprises a release actuator and a plectrum follower. The release actuator is operatively mounted on the car seat, and the plectrum follower is associated with the release actuator for rotating the hooking element from the locked position to the release position, so as to permitting a user to release the car seat from the base by operating of the release actuator.

By utilizing the simplified locking mechanism, the locking and unlocking of the car seat and base according to the present invention can be used in a convenient way, and the manufacturing as well as the assembly process may also be cost down largely.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
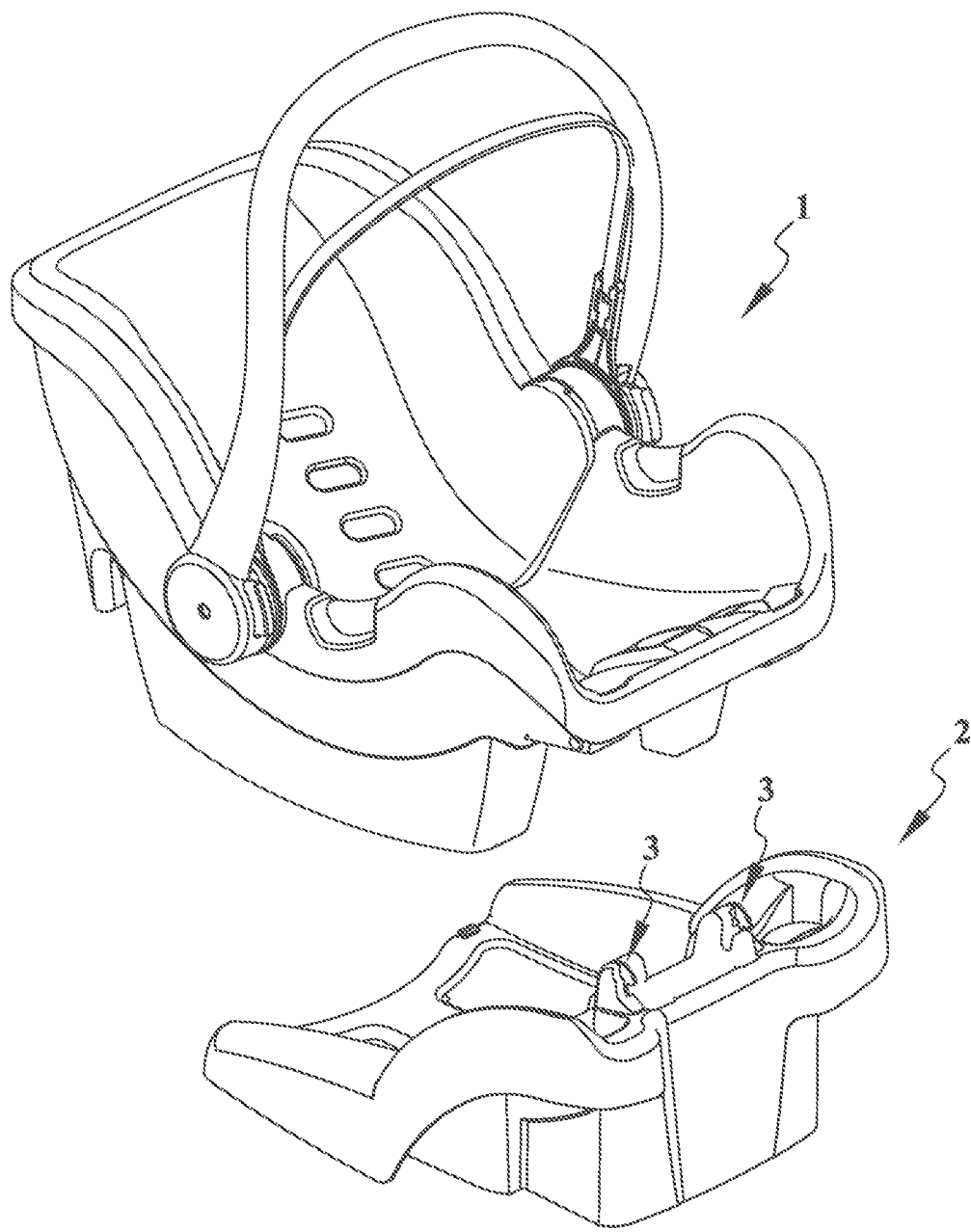
FIG. 1 is a schematic perspective view for illustrating the separation of the car seat and base according to the present invention.
Figure 2:
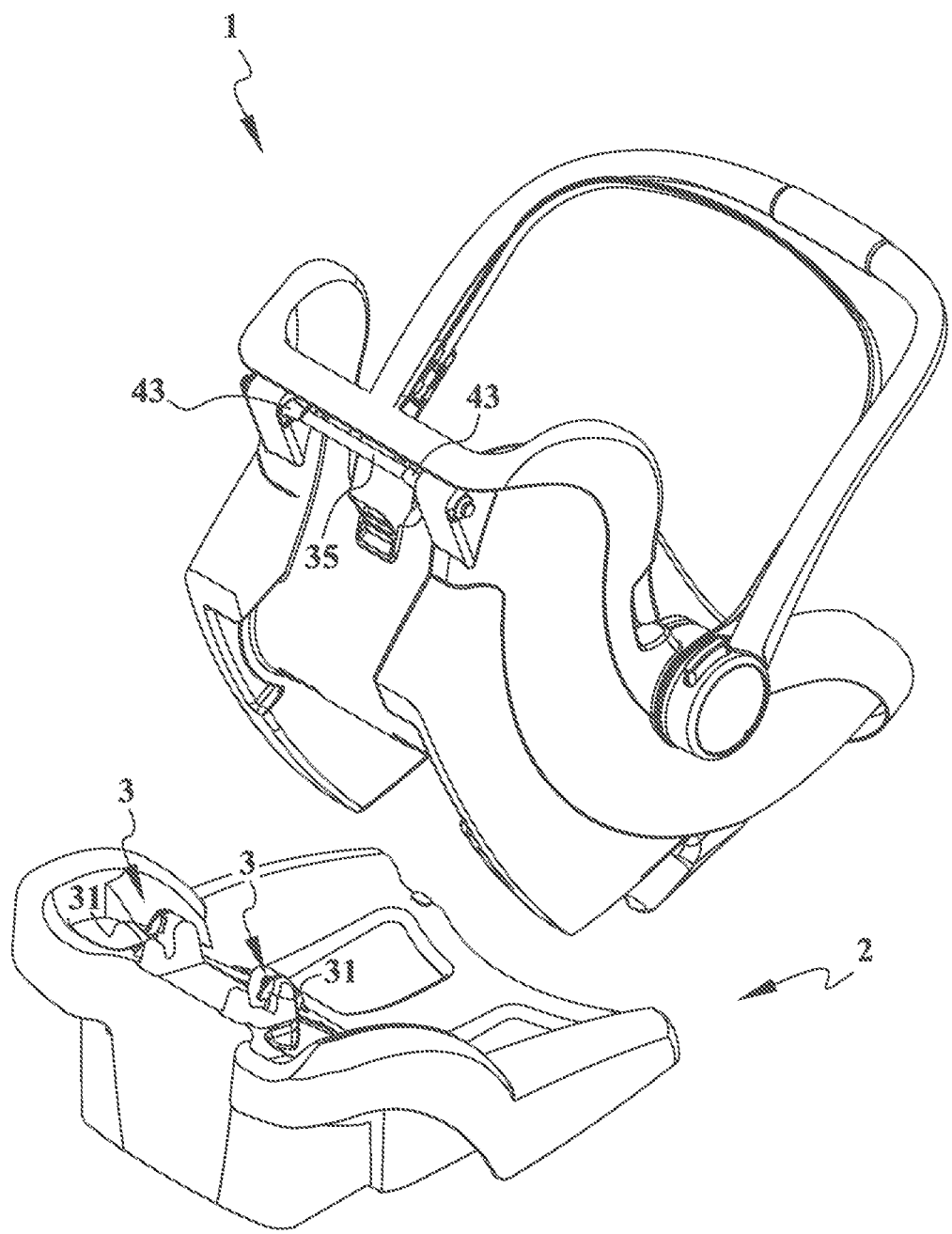
FIG. 2 is a schematic perspective view took from another direction for illustrating the separated car seat and base of FIG. 1.
Figure 3:
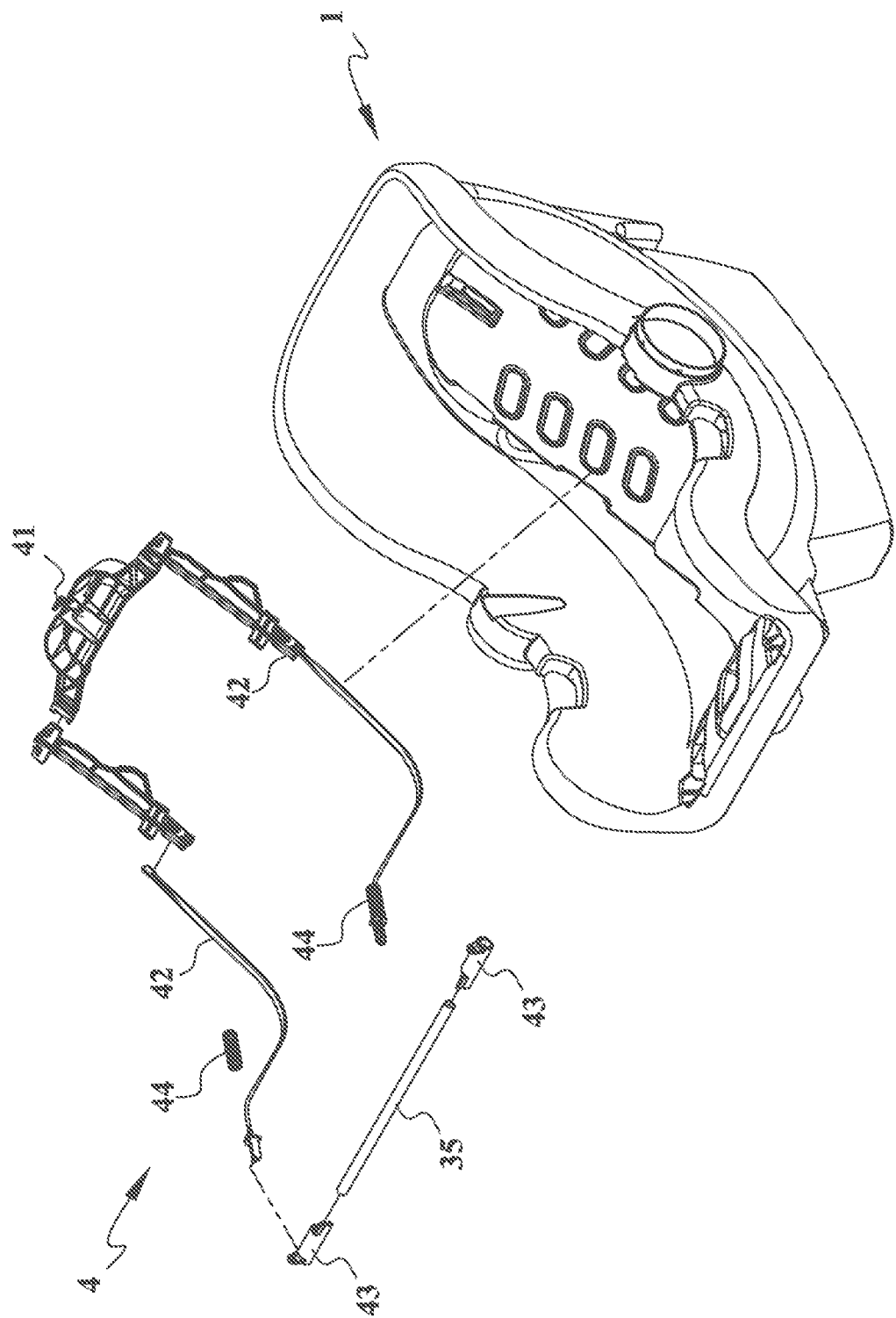
FIG. 3 is an exploded perspective view of an embodiment of the release mechanism according to the present invention.
Figure 4:
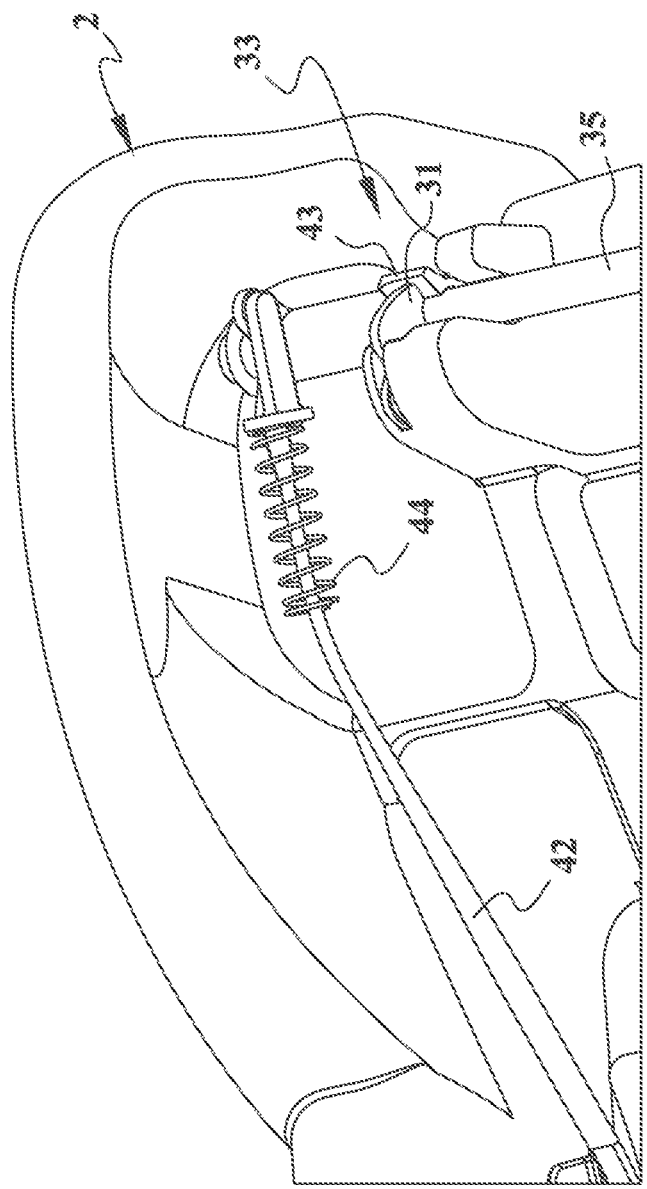
FIG. 4 is a schematic view of an embodiment of the locking mechanism according to the present invention, in which a hooking element is rotated to a locked position and hooked the car seat on the base.
Figure 5:
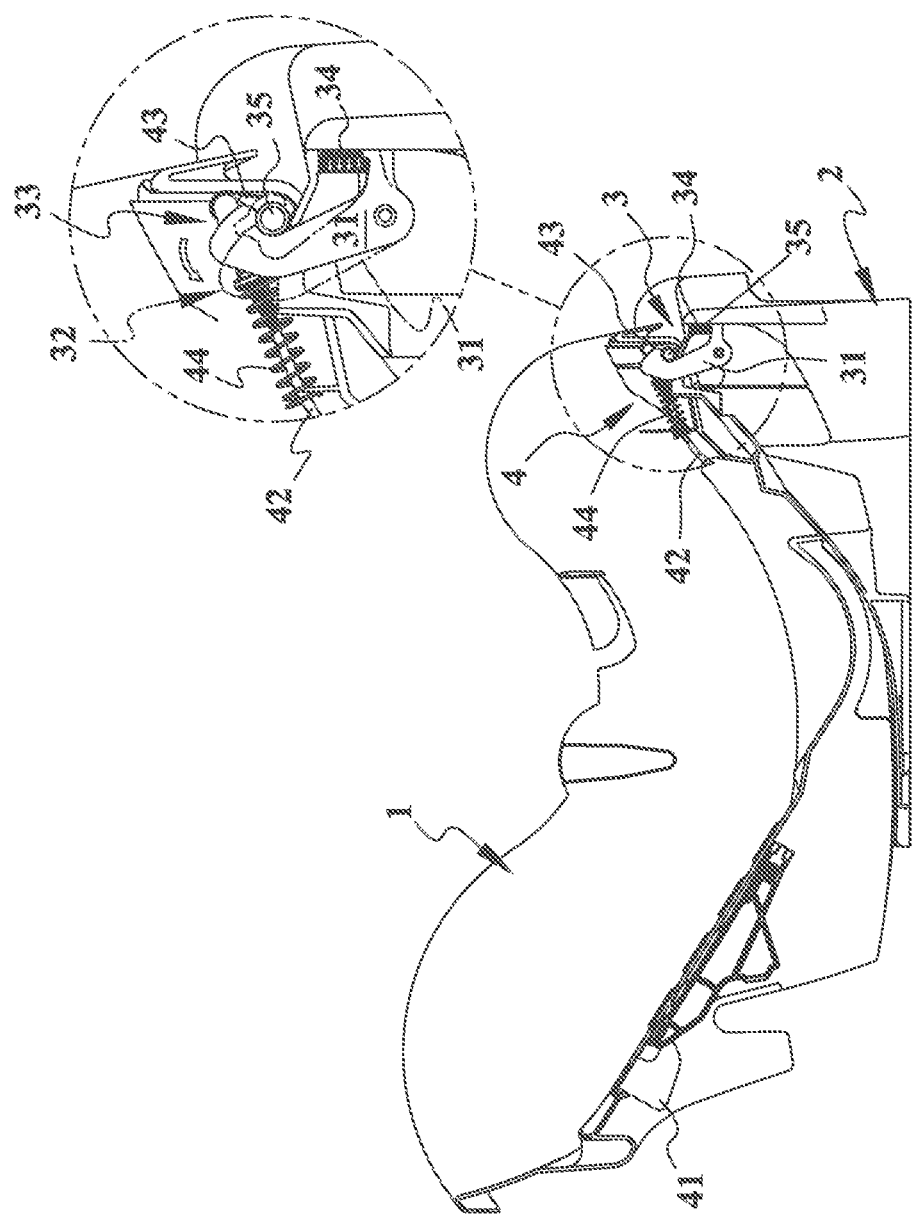
FIG. 5 is a schematic view of the embodiment of the locking mechanism of FIG. 4, in which the hooking element can be rotated to a release position by a plectrum follower for releasing the car seat from the base.

Referring to FIGS. 1 to 4, a car seat 1 and base 2 with a locking mechanism 3 are illustrated according to the present invention. The locking mechanism 3 is mounted on the base 2, and a release mechanism 4 is mounted on the car seat 1.

The locking mechanism 3 comprises a hooking element 31 can be rotated to a locked position 33 for retaining the car seat 1 to the base 2, and to a release position 32 to release the car seat 1 from the base 2.

The release mechanism 4 comprises a release actuator 41 and a plectrum follower 43. The release actuator 41 is operatively mounted on the car seat 1, and the plectrum follower 43 is associated with the release actuator 41 for rotating the hooking element 31 from the locked position 33 to the release position 32, so as to permitting a user to release the car seat 1 from the base 2 by operating of the release actuator 41.

The car seat 1 may be provided with an anchoring rod 35 at the underside thereof to be hooked by the hooking element 31 when the hooking element 31 is rotated to the locked position 33 thereby locking the car seat 1 on the base 2.

The locking mechanism 3 may further include a return spring 34 for biasing the hooking element 31 to the locked position 33.

In one embodiment, the plectrum follower 43 can be rotatively sleeved on the anchoring rod 35, the release mechanism 4 includes an associating member 42 for movably connecting between the plectrum follower 43 and the release actuator 41. The associating member 42 may be embodied as a wire, plastic piece, or any other flexible element.

The release mechanism 4 may further include a resilient element 44 for biasing on and keeping the plectrum follower 43 always contacting the hooking element 31.

The locking mechanism 3 may comprise more than one hooking element 31; for example, the locking mechanism 3 comprises two hooking elements 31 to be rotated to the locked position 33 at the same time so as to hook the anchoring rod 35 for retaining the car seat 1 to the base 2, and be rotated to the release position 32 at the same time so as to release the car seat 1 from the base 2.

The release mechanism 4 may also comprise more than one plectrum follower 43; for example, the release mechanism 4 comprises two plectrum follower 43 associated with the release actuator 41 for rotating the two hooking elements 31 respectively from the locked position 33 to the release position 32, so as to permit a user to release the car seat 1 from the base 2 by operating of the release actuator 41 by hands.

Further, the release mechanism 4 may include only one associating member 42 to connect the release actuator 41 and the two plectrum followers 43, thereby permitting the user to release the car seat 1 from the base 2 by one-hand operation of the release actuator 41.

According to the present invention, the structure of the car seat 1 and base 2 with a locking mechanism 3 as well as the release mechanism 4 have greatly simplified to provide a reliably and convenient way for users to use.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A car seat and base with a locking mechanism mounted on the base, and a release mechanism mounted on the car seat; the locking mechanism comprising:
    a hooking element rotatable to a locked position for retaining the car seat to the base, and a release position to release the car seat from the base; and
    the release mechanism comprising:
    a release actuator operatively mounted on the car seat; and
    a plectrum follower associated with the release actuator for rotating the hooking element from the locked position to the release position, so as to permit a user to release the car seat from the base by operating of the release actuator;
    wherein the car seat has an anchoring rod having a lengthwise central axis, the anchoring rod to be hooked by the hooking element in the locked position so as to lock the car seat on the base, and the plectrum follower is rotatively sleeved on the anchoring rod for rotation about the lengthwise central axis.

2. The car seat and base with a locking mechanism according to claim 1, wherein the locking mechanism further includes a return spring for biasing the hooking element to the locked position.

3. The car seat and base with a locking mechanism according to claim 1, wherein the release mechanism further includes an associating member movably connecting the plectrum follower and the release actuator.

4. The car seat and base with a locking mechanism according to claim 1, wherein the release mechanism further includes a resilient element biasing on and keeping the plectrum follower contacting the hooking element.

5. A car seat and base with a locking mechanism mounted on the base, and a release mechanism mounted on the car sea; the locking mechanism comprising:
    two hooking elements rotatable to a locked position at the same time for retaining the car seat to the base and a release position to release the car seat from the base; and
the release mechanism comprising:
    a release actuator operatively mounted on the car seat; and
    two plectrum followers associated with the release actuator for rotating the two hooking elements respectively from the locked position to the release position, so as to permit a user to release the car seat from the base by operating of the release actuator;
    wherein the car seat has an anchoring rod having a lengthwise central axis, the anchoring rod to be hooked by the hooking element in the locked position so as to lock the car seat on the base, and the plectrum follower is rotatively sleeved on the anchoring rod for rotation about the lengthwise central axis.

6. The car seat and base with a locking mechanism according to claim 5, wherein the release mechanism further includes an associating member movably connecting the release actuator and the two plectrum followers, so as to permit a user to release the car seat from the base by one-hand operation of the release actuator.

* * * * *